US005684925A

United States Patent [19]
Morin et al.

[11] Patent Number: 5,684,925
[45] Date of Patent: Nov. 4, 1997

[54] SPEECH REPRESENTATION BY FEATURE-BASED WORD PROTOTYPES COMPRISING PHONEME TARGETS HAVING RELIABLE HIGH SIMILARITY

[75] Inventors: Philippe R. Morin; Ted H. Applebaum, both of Santa Barbara, Calif.

[73] Assignee: Matsushita Electric Industrial Co., Ltd., Osaka, Japan

[21] Appl. No.: 526,719

[22] Filed: Sep. 8, 1995

[51] Int. Cl.$^6$ .................................................. G10L 5/06
[52] U.S. Cl. ................... 395/2.63; 395/2.48; 395/2.49; 395/2.5; 395/2.52
[58] Field of Search ................... 395/2.48, 2.49, 395/2.5, 2.52, 2.6, 2.63

[56] References Cited

U.S. PATENT DOCUMENTS

| | | | |
|---|---|---|---|
| 3,770,892 | 11/1973 | Clapper | 395/2.6 |
| 4,481,593 | 11/1984 | Bahler | 395/2.62 |
| 4,489,434 | 12/1984 | Moshier | 395/2.48 |
| 4,489,435 | 12/1984 | Moshier | 395/2.53 |
| 4,528,688 | 7/1985 | Ichikawa et al. | 395/2.48 |
| 4,559,602 | 12/1985 | Bates, Jr. | 364/487 |
| 4,624,011 | 11/1986 | Watanabe et al. | 395/2.63 |
| 4,718,094 | 1/1988 | Bahl et al. | 395/2.65 |
| 4,723,290 | 2/1988 | Watanabe et al. | 395/2.63 |
| 4,736,429 | 4/1988 | Niyada et al. | 395/2.63 |
| 4,742,547 | 5/1988 | Watanabe | 395/2.5 |
| 4,748,670 | 5/1988 | Bahl et al. | 395/2.65 |
| 4,780,906 | 10/1988 | Rajasekaran et al. | 395/2.6 |
| 4,803,729 | 2/1989 | Baker | 395/2.5 |
| 4,820,059 | 4/1989 | Miller et al. | 395/2.63 |
| 4,905,287 | 2/1990 | Segawa | 395/2.63 |
| 4,908,865 | 3/1990 | Doddington et al. | 395/2.5 |
| 4,924,518 | 5/1990 | Ukita | 395/2.48 |
| 4,937,871 | 6/1990 | Hattori | 395/2.42 |
| 4,987,596 | 1/1991 | Ukita | 395/2.48 |
| 5,027,408 | 6/1991 | Kroeker et al. | 395/2.63 |
| 5,129,001 | 7/1992 | Bahl et al. | 395/2.6 |
| 5,131,043 | 7/1992 | Fujii et al. | 395/2.63 |
| 5,195,167 | 3/1993 | Bahl et al. | 395/2.09 |
| 5,195,168 | 3/1993 | Yong | 395/2.29 |
| 5,197,113 | 3/1993 | Mumolo | 395/2.09 |
| 5,218,668 | 6/1993 | Higgins et al. | 395/2.09 |
| 5,233,681 | 8/1993 | Bahl et al. | 395/2.6 |
| 5,241,619 | 8/1993 | Schwartz et al. | 395/2.09 |
| 5,268,990 | 12/1993 | Cohen et al. | 395/2.09 |
| 5,309,547 | 5/1994 | Niyada et al. | 395/2.47 |
| 5,345,536 | 9/1994 | Hoshimi et al. | 395/2.52 |
| 5,349,645 | 9/1994 | Zhao | 395/2.52 |
| 5,369,727 | 11/1994 | Nomura et al. | 395/2.61 |
| 5,369,728 | 11/1994 | Kosaka et al. | 395/2.63 |
| 5,390,278 | 2/1995 | Gupta et al. | 395/2.49 |
| 5,522,011 | 5/1996 | Epstein et al. | 395/2.31 |

OTHER PUBLICATIONS

Ronald Cole, Krist Roginski and Mark Fanty, "English Alphabet Recognition With Telephone Speech".

Climent Nadeu and Biing–Hwang Juang, "Filtering of Spectral Parameters for Speech Recognition", pp. S31–24.1 – S31–24.3, 1994.

(List continued on next page.)

*Primary Examiner*—Allen R. MacDonald
*Assistant Examiner*—Tälivaldis Ivars Šmits
*Attorney, Agent, or Firm*—Harness, Dickey & Pierce, P.L.C.

[57] ABSTRACT

Digitized speech utterances are converted into phoneme similarity data and regions of high similarity are then extracted and used in forming the word prototype. By alignment across speakers unreliable high phoneme similarity regions are eliminated. Word prototype targets are then constructed comprising the following parameters: the phoneme symbol, the average peak height of the phoneme similarity score, the average peak location and the left and right frame locations. For each target a statistical weight is assigned representing the percentage of occurrences the particular high similarity region occurred across all speakers. The word prototype is feature-based allowing a robust speech representation to be constructed without the need for frame-by-frame analysis.

45 Claims, 13 Drawing Sheets

OTHER PUBLICATIONS

Cole, Fanty, Gopalakrishnan and Janssen, "Speaker–Independent Name Retrieval From Spellings Using a Database of 50,000 Names", pp. 325–328, 1991.

Philippe Morin, Jean–claude Junqua, "Habitable Interaction in Goal–Oriented Multimodal Dialogue Systems", pp. 1669–1672.

Hoshimi, Miyata, Kiroaka and Niyada, "Speaker Independent Speech Recognition Method Using Training Speech From a Small Number of Speakers", pp. 1–469 –1–472, 1992.

Yifan Gong and Jean–Paul Haton, "Plausibility functions in continuous speech recognition: The VINICS system", pp. 187–195, 1993.

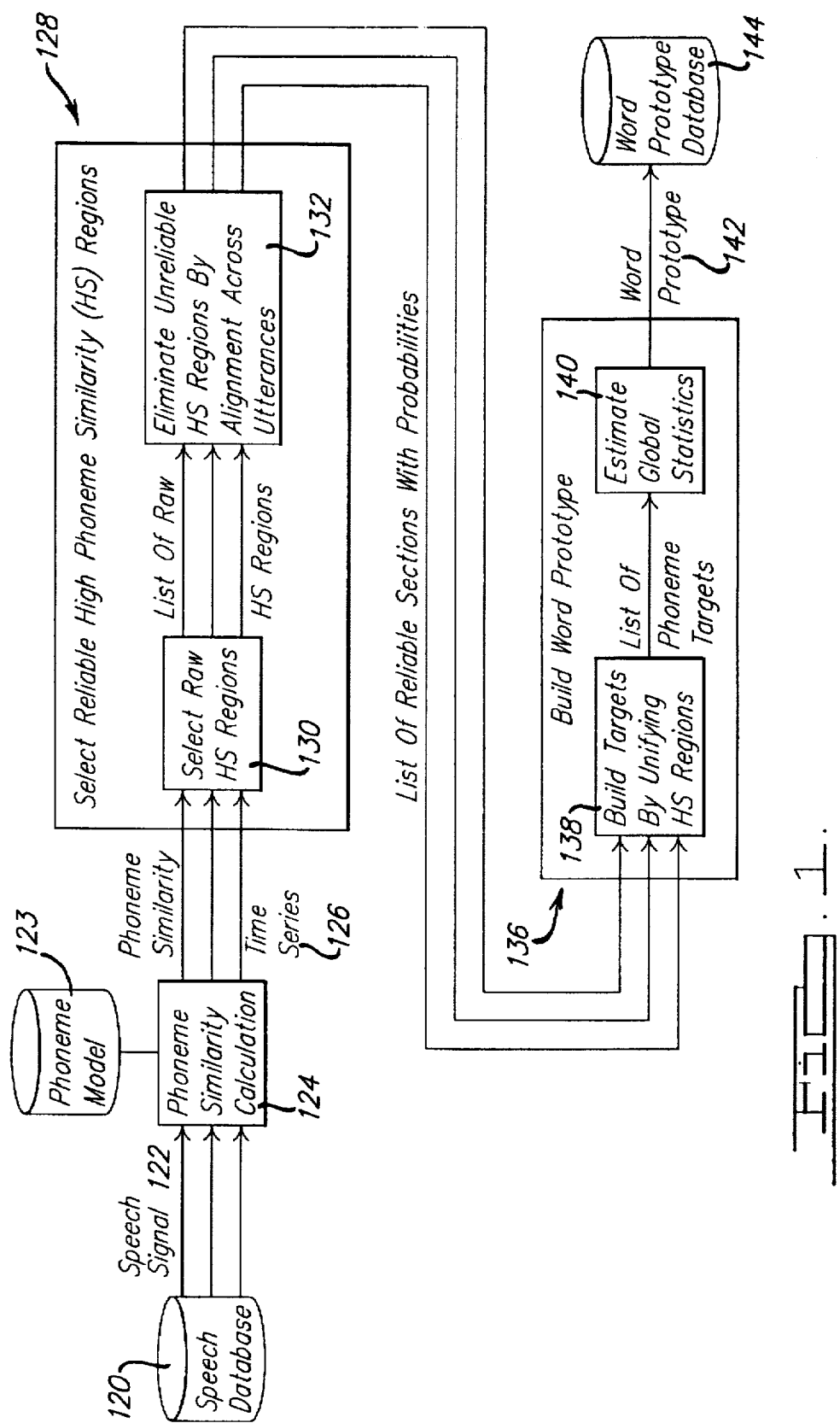

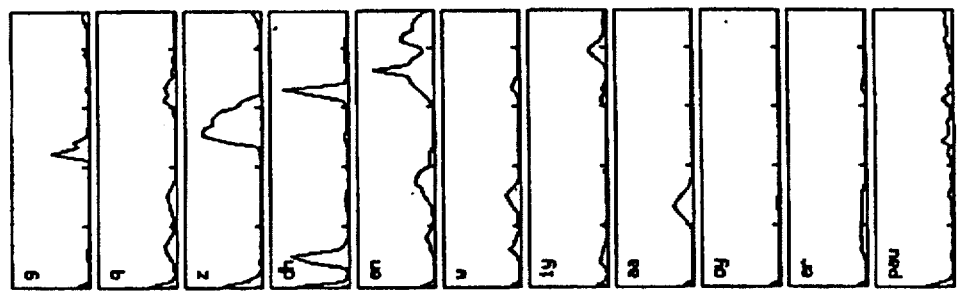
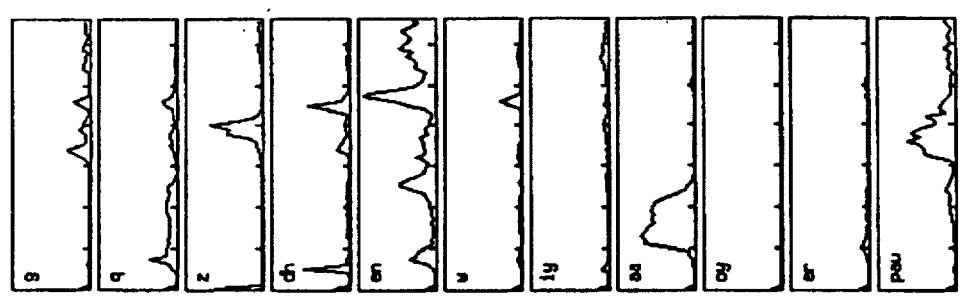
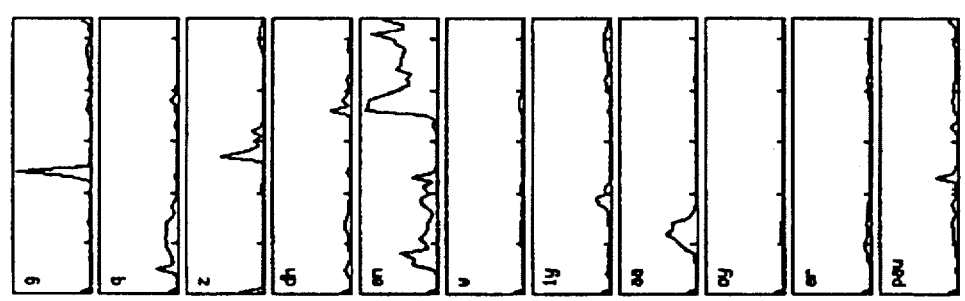
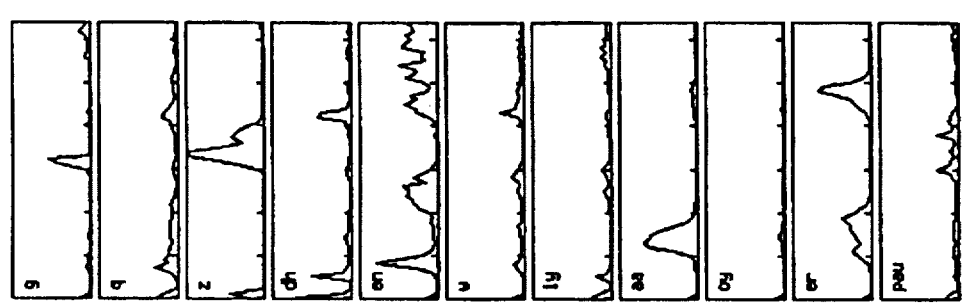

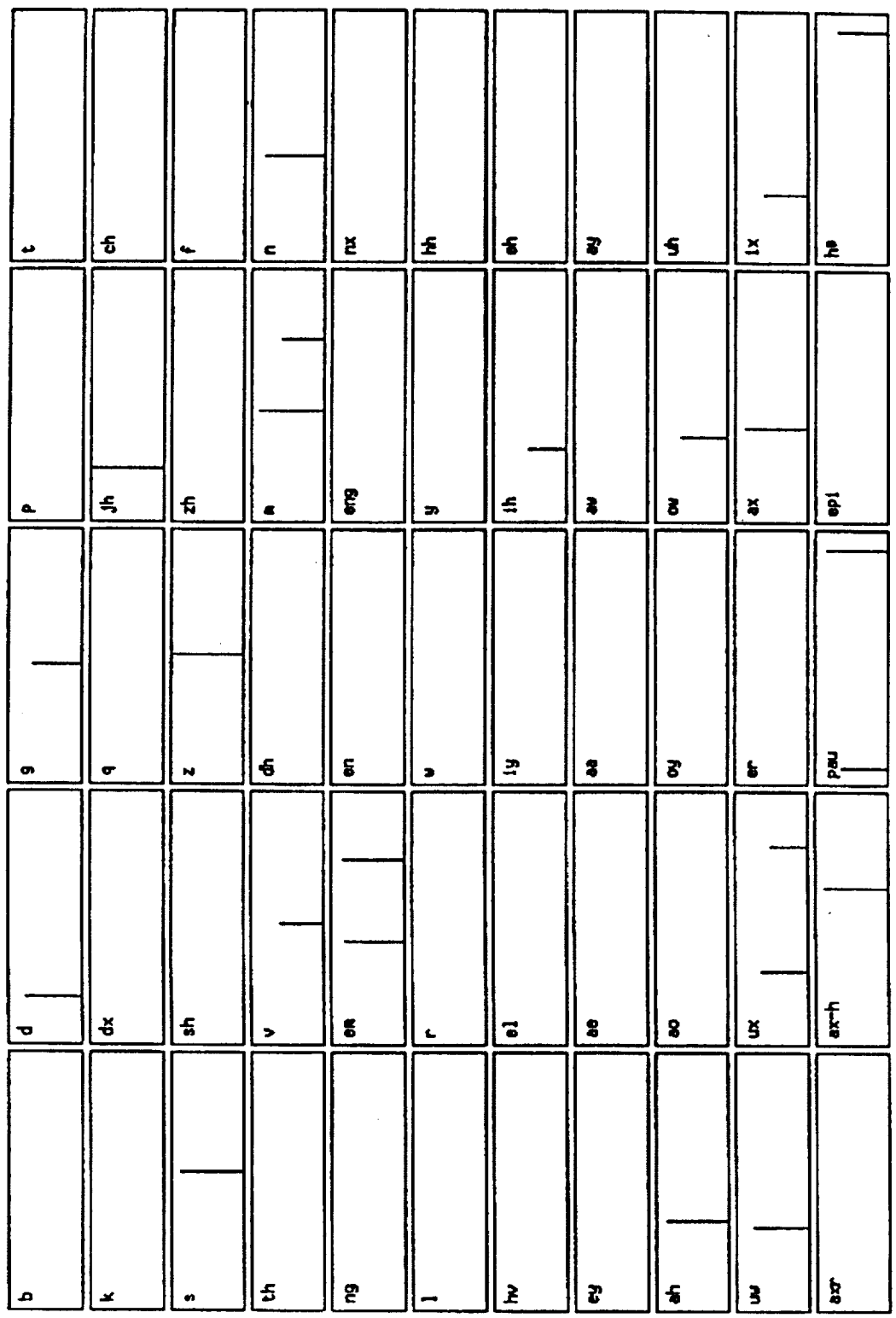

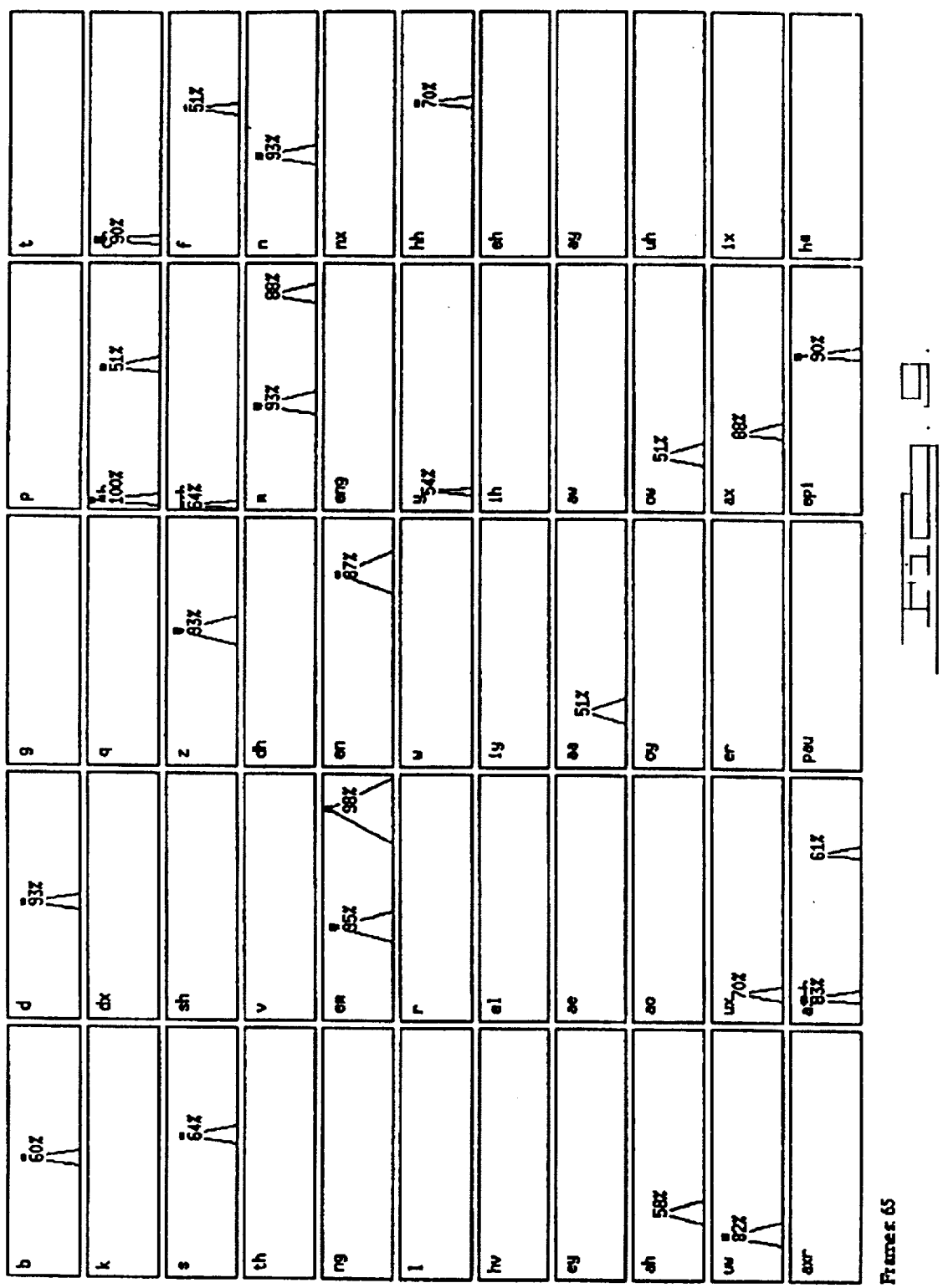

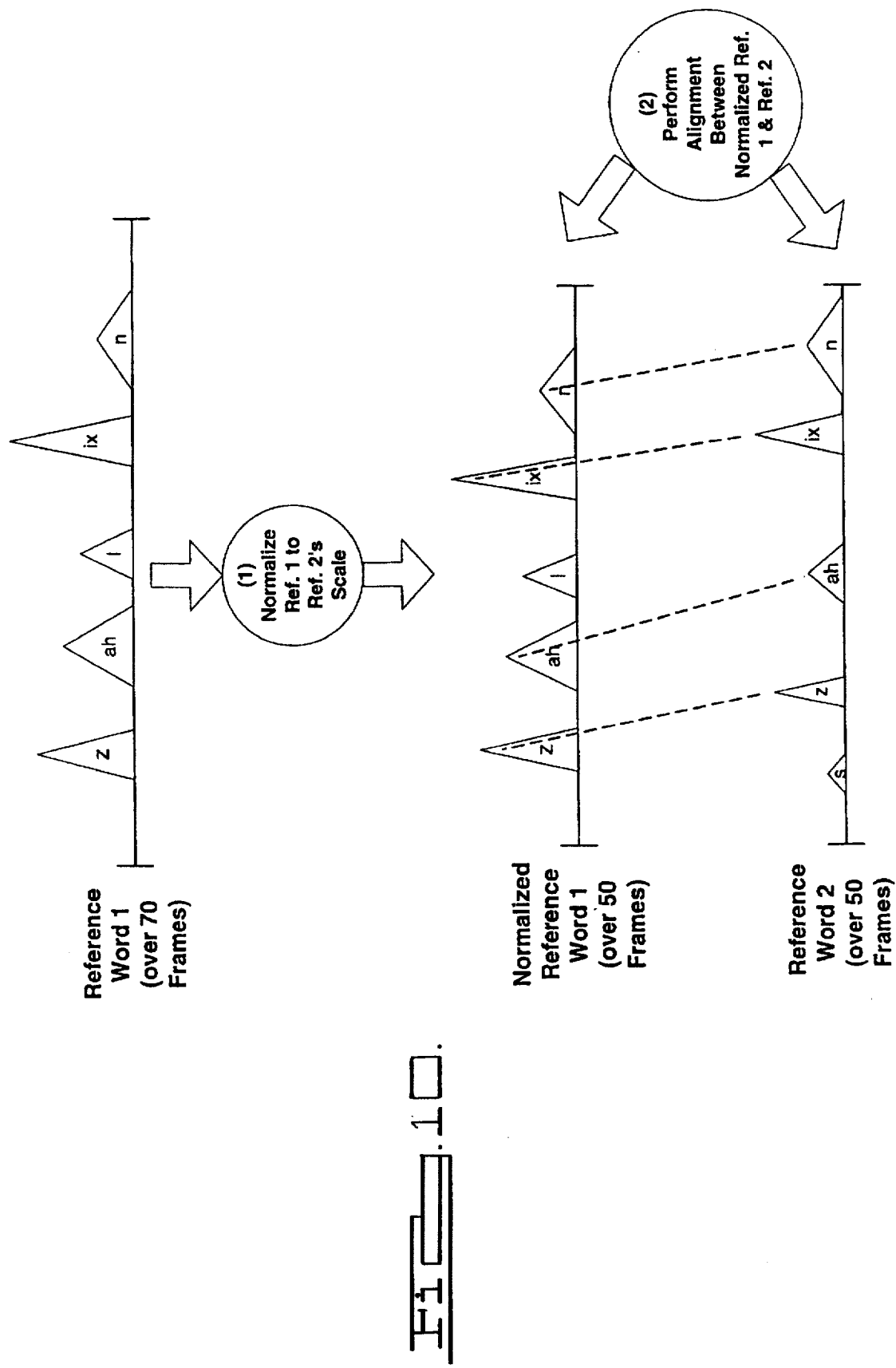

SPEECH REPRESENTATION BY FEATURE-BASED WORD PROTOTYPES COMPRISING PHONEME TARGETS HAVING RELIABLE HIGH SIMILARITY

BACKGROUND AND SUMMARY OF THE INVENTION

The present invention relates generally to speech recognition systems. More particularly, the invention relates to a system for electronically representing a given speech utterance signal as a digital prototype. The prototype is based on prominent features present in phoneme similarity data, resulting in a highly compact, data-driven representation of the speech.

Conventional speech processing technology starts with a digitized speech utterance and then analyzes the digitized data in blocks comprising a predetermined number of samples. Thus the conventional system breaks the incoming speech signal into time segments so that each segment can be analyzed and coded separately. With the conventional technique it is therefore common practice to store a fixed number of feature parameters per time segment or frame. Common practice is to analyze speech at a fixed frame rate of 50 to 100 frames per second and represent speech by a fixed number of feature parameters in each frame. These feature parameters are usually the parameters of a parametric model of the short term spectral shape and their derivatives.

Hoshimi et al., U.S. Pat. No. 5,345,536 proposed a speech representation also employing a fixed number of feature parameters per analysis frame, in which the feature parameters are phoneme similarity values. In this representation it is not necessary to store all phoneme similarity values for each frame, but to store the phoneme similarity value and phoneme index of the M (e.g. M=6) largest phoneme similarity values (e.g. 12 parameters per frame, or 1200 parameters per second, assuming 100 frames per second).

These conventional high data rate systems then compare the feature parameters, element by element, between the reference data (training data) and the test data. The number of comparisons is thus proportional to the square of the number of parameters used. Hence high data rate systems produce a high computational overhead that may rule out slower, less expensive processors that would otherwise be desirable for use in low cost consumer products.

The present invention takes a new approach to the digitized speech coding problem. The present invention replaces the frame-based prototype with a feature-based prototype. Our proposed speech representation is to store "targets" which characterize reliably found regions of high phoneme similarity. Targets contain five parameters in the first preferred embodiment (more or fewer parameters may be used in other embodiments at other degrees of modeling detail). Unlike frames, targets do not occur at a fixed rate per second. However, on average, the number of targets per second can be manipulated, by adjusting a threshold in the word model training procedure. In the first preferred embodiment the threshold is chosen to establish an average number of targets per second of 50. Hence this yields the typical value of 250 parameters per second for a target congruence speech representation.

Instead of devoting equal computational energy to each frame in the utterance (as conventional systems do), the invention concentrates its computational energy on only those high similarity regions with features that rise above a predetermined similarity threshold. This results in a data-driven digital prototype that can be used to electronically represent speech with roughly a fivefold to tenfold reduction in data rate. Because of the square law relationship described above, the reduced data rate substantially reduces computational overhead.

While a reduction in computational overhead of this magnitude might be expected to significantly degrade the recognition accuracy of a speech recognition system, such is not the case. Using the digital prototype of the invention in a word hypothesizer we have demonstrated reduced alignment complexity by 92%, with no increase to error rate for noise-free test data on a 100 word task. Also, because the threshold of the word model training procedure can be readily adjusted, the hypothesizer can be easily fine-tuned to optimize performance for a given processor's computational capacity.

The present invention electronically represents a given speech utterance signal as a digital prototype according to the following method. The prototype model is built by providing at least two utterances of training speech in order to measure the reliability with which particular regions of high phoneme similarity are found in the training data for a particular word. This ensures that only targets corresponding to reliably found regions of phoneme similarity are preserved in the word prototype.

Training utterances may be obtained from a given single speaker ("Speaker-Dependent" training), a large number of highly diverse representative speakers ("Speaker-Independent" training) or some other distribution of speakers (e.g. "Cross-Speaker" training).

For each given training utterance, the speech data is processed to obtain phoneme similarity values for each phoneme symbol in each time frame (e.g. as is done by Hoshimi et al.). Then the "raw" regions of high phoneme similarity (HS regions) are found by a region picking procedure. The output of this procedure represents HS regions that have not yet been screened for high reliability.

Having extracted raw HS regions for all training utterances, the reliably found HS regions are determined by aligning all pairs of training utterances. Note that, as the utterances are represented as a series of HS regions (rather than a series of frames) aligning a pair of utterances requires finding pairs of regions, one in each utterance, which may be matched. HS regions may only be matched if they are in different utterances, have identical phoneme symbols and their time locations may be made to closely agree by a suitable shifting and stretching of the time scale. In this regard, a region in utterance "A" may match at most one other region in utterance "B."

The initial targets are instantiated in the word prototype for a cluster of HS regions (different occurrences from several training utterance) which is found with sufficient probability in the training data. An initial target is created for a cluster of matching HS regions for which the probability (the fraction of training utterances in which the regions were matched) exceeds a "Reliability_Threshold" (e.g. 0.25). The target symbol is the common symbol of the HS regions. The Target Weight is the probability. The target peak height, left and right frame locations are averages of the corresponding values over the matching HS regions.

The number of targets in the word prototype may further be reduced to conform to a predetermined Target_Rate (i.e. desired number of targets per second as measured in the training data), by eliminating those initial targets with lowest probability ("Target Weight").

The word prototype consists of the surviving targets plus the average word duration and average match rate (i.e. average region-to-target alignment score on the training data).

For a more complete understanding of the invention, its objects and advantages, refer to the following specification and to the accompanying drawings.

BRIEF DESCRIPTION OF THE DRAWINGS

FIG. 1 is a block diagram illustrating the word prototype training procedure;

FIG. 5 is a set of graphs that shows a comparison of phoneme similarity curves for the word "Johnson" as spoken by four different speakers;

FIG. 6a is a graph generically illustrating the various features of a phoneme similarity curve;

FIG. 9 is a set of graphs using five target features to represent an utterance; and FIG. 10 is a set of graphs illustrating the word to prototype alignment used in the iterative prototype building process.

DESCRIPTION OF THE PREFERRED EMBODIMENT(S)

FIG. 1 gives an overview of the system for constructing the feature-based word prototype. The word prototype is trained using a plurality of utterances for a given set of words. These utterances are digitized and stored in a speech database 120. A phoneme similarity calculation module 124 processes the speech signal 122 to produce a phoneme similarity time series. The phoneme similarity calculation module uses a phoneme model or phoneme template 123 in producing the phoneme similarity time series. This may be accomplished according to the teachings of Hoshimi et al., cited above.

Figure 4:
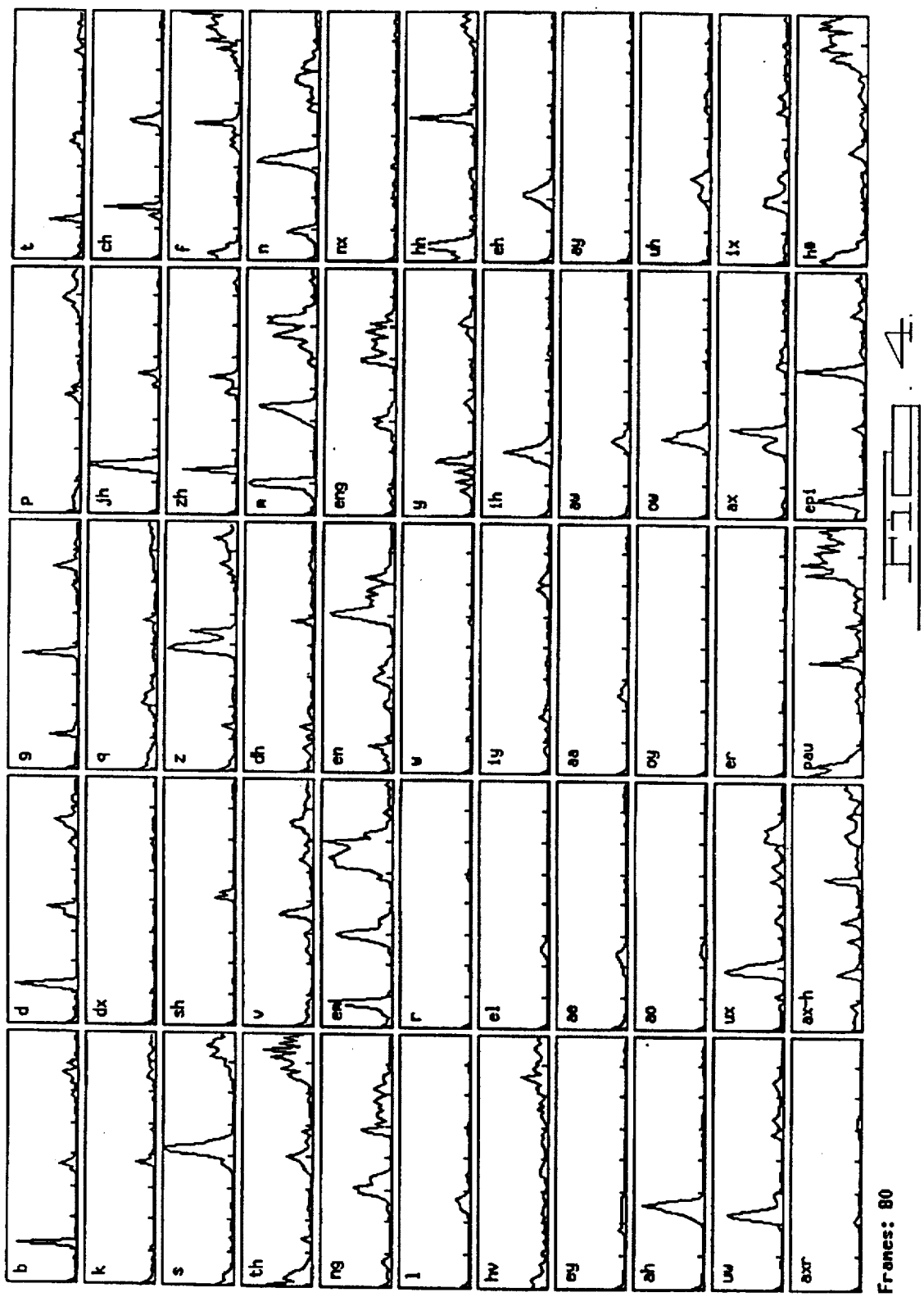
FIG. 4 is a set of graphs that shows the phoneme similarity curves for the word "Johnson"

The phoneme similarity time series 126 is supplied to a series of modules depicted generally at 128. These modules are responsible for selecting reliable sections or regions in the phoneme similarity data. First, module 130 selects all raw peaks or regions that exceed a predefined threshold. Referring to FIG. 4, it is seen that the phoneme similarity data exhibit regions corresponding to some of the 55 phoneme components. Essentially, any region above a predefined threshold is selected by module 130 as a raw high similarity region. This list of raw high similarity regions is then processed in module 132 to eliminate unreliable high similarity regions by alignment across multiple utterances. For example, if the data of a single utterance exhibits a region in the "ah" phoneme component, but the remaining n utterances in speech database 120 do not contain this peak, then the "ah" region detected for the one utterance would be deemed as unreliable and is discarded by module 132.

Having selected all reliable high similarity regions, the word prototype is next built using the modules designated generally at 136. First module 138 builds targets corresponding to the high similarity regions. This is done by unifying the high similarity regions across all utterances. This is done by merging the reliable high similarity region data for all speakers to achieve a single composite word prototype that represents all n utterances for each word in the database. When building the targets by unifying the data across speakers, statistical information is used to give appropriate weights to the high similarity regions as is more fully discussed below. Each high similarity region is represented by a "target" that comprises 5 parameters in the presently preferred embodiment. Each target comprises a phoneme symbol identifier (a name or label identifying one of the 55 phonemes depicted in FIG. 4), a target center height, a target center frame location, a left frame location and a right frame location. Essentially, the presently preferred embodiment models each target as a triangular shape. See FIG. 6b, in which the center location is at 330, the peak height is at 336, and the left and right frame boundaries are at 332 and 334, respectively.

In addition to generating a list of phoneme targets for each word in the word prototype database, the system also estimates global statistics in module 140. The global statistics specify the probability of finding a given target in the modeled word. These statistics are used as weighting factors when the word prototype is used in a speech recognizer or hypothesizer. The word prototype 142, so developed, is then stored in a word prototype database 144. The word prototype database may contain a word prototype for each word found in the original speech database 120. Whereas the original speech database 120 comprises a substantial amount of digitized information for n utterances of a plurality of words, the word prototype database is far more compact. It contains a comparatively small list of targets (and associated global statistics) for each word in the original speech database. The original speech database 120 breaks each utterance into a series of sequential time frames, each containing potentially important information. In contrast, the word prototype database 144 does not require storage of information on a frame-by-frame basis. Only reliable high similarity regions are retained and these are parameterized as targets. These targets compactly represent not only the salient features of the n utterances, but also the degree to which certain features may vary across speakers. The result is a highly robust speech representation that may be used in speech recognizers or speech hypothesizers. By eliminating the necessity of retaining frame-by-frame data the word prototype is highly compact, making it ideal for speech applications in which memory storage capacity and processing power are limited.

Figure 2A:
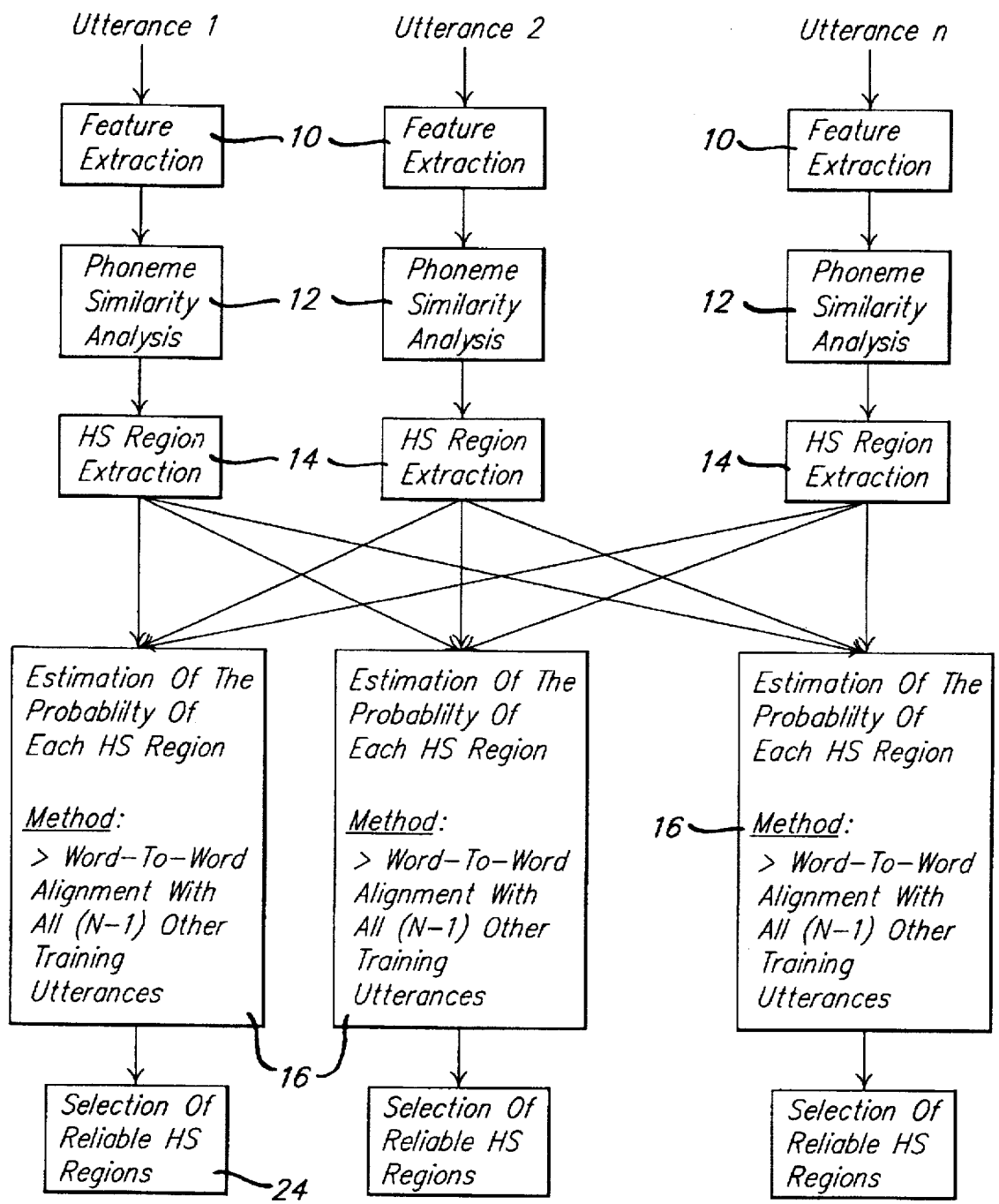
FIGS. 2a, 2b and 2c (collectively referred to as FIG. 2) comprise a flow diagram depicting an overview of the system for representing speech as feature-based word prototype.
Figure 2B:
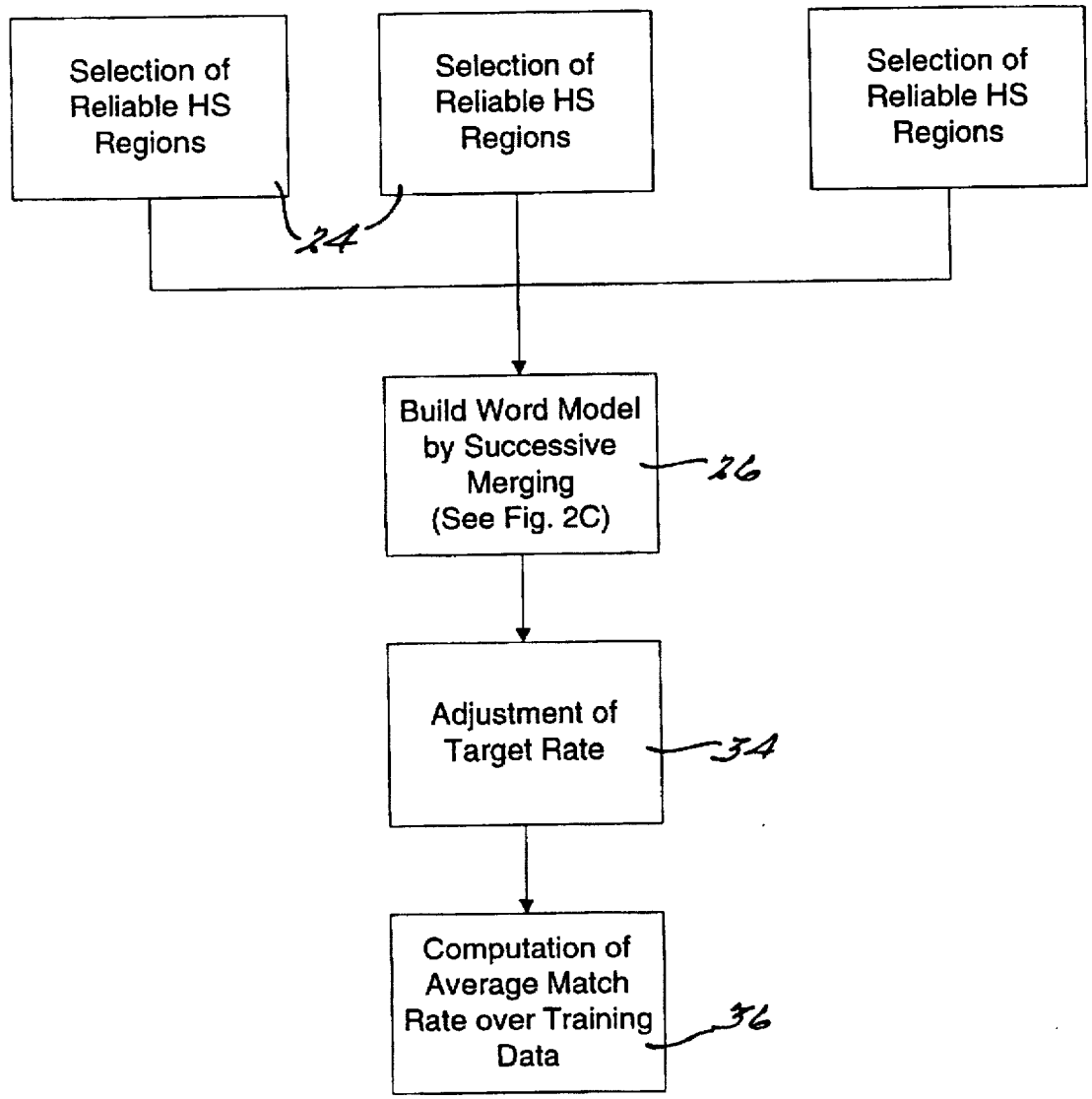
Figure 2C:
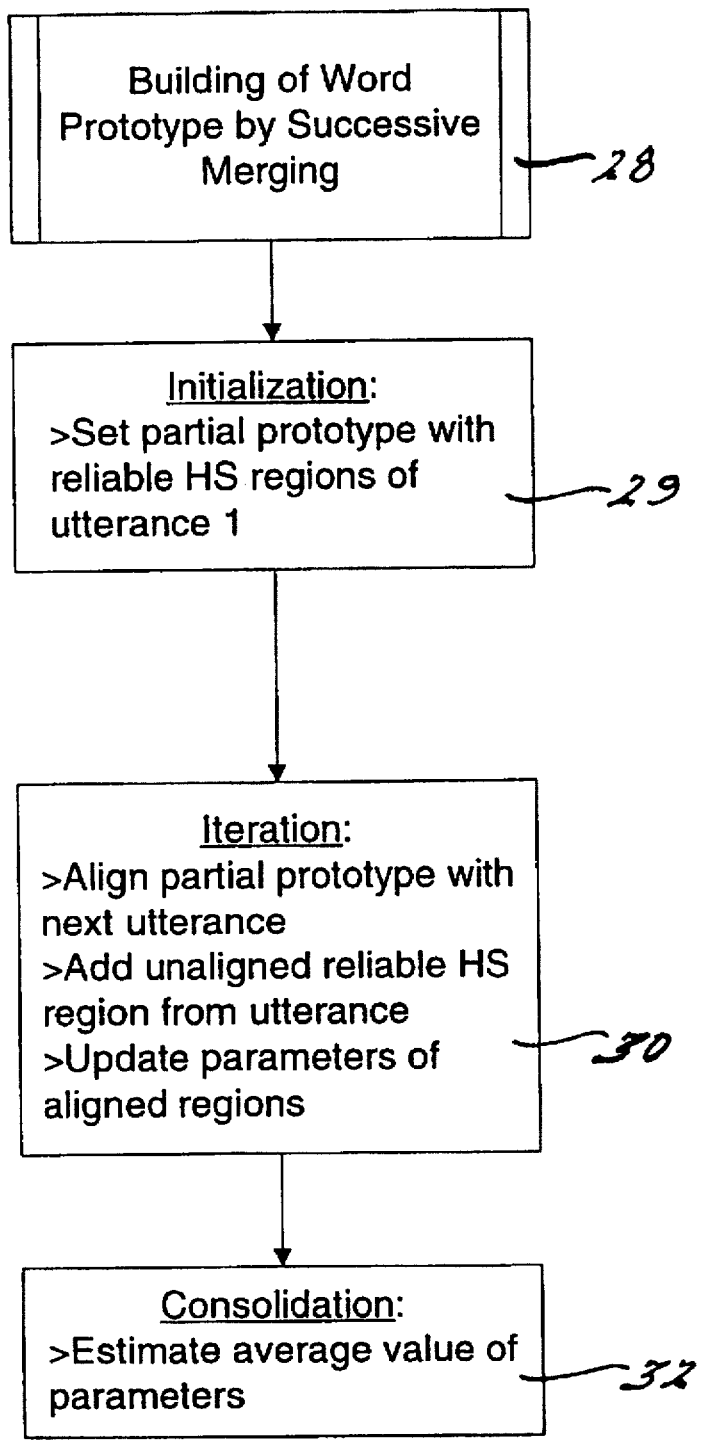

FIGS. 2a, 2b and 2c (collectively FIG. 2) more fully illustrate how the word prototype is constructed. FIG. 2 depicts the presently preferred word training procedure. A plurality of utterances of a given word are used to construct the word prototype. These utterances may be by the same speaker or by different speakers. In FIG. 2a n utterances are illustrated. Each utterance is processed separately up to a certain point, as illustrated in FIGS. 2a and 2b. Ultimately, the results of the individually processed utterances are combined to produce the word prototype for the given word.

Each utterance is first subjected to feature extraction signal processing as depicted at step 10. This involves digitizing the speech preferably at 8 kilohertz and then using an end point detection procedure to automatically detect the beginning and end of the speech. An 8th order linear predictive coding (LPC) analysis is made on the detected speech.

Next, a phoneme similarity analysis is performed on the data as at step 12. Phoneme similarities are computed for each phoneme of a phoneme database. The presently preferred embodiment breaks down speech into 55 phonemes corresponding to the different sounds that make up speech. See FIG. 4 which illustrates exemplary data in a 5×11 grid corresponding to the 55 phonemes. The phoneme similarity analysis is preferably performed periodically so that every 10 milliseconds of speech is represented by a vector of 55 components representing phoneme similarity data.

Next, the high similarity (HS) region picking procedure (step 14) detects for each phoneme those regions that include at least one peak of phoneme similarity value that exceed a predefined threshold. Referring again to FIG. 4, it is seen that certain phonemes contain phoneme similarity peaks. The data illustrated in FIG. 4 are for the spoken word "Johnson." By way of illustration, the phoneme "em" contains several phoneme similarity regions in this particular utterance; the phoneme "ey" contains no regions in this particular utterance. The presently preferred embodiment uses 5 parameters to represent an HS region. These parameters are the phoneme label, namely the identifier corresponding to the given phoneme ("em" and "ey" for example); the center height, the center frame location, the left frame location and the right frame location. These parameters are illustrated in FIG. 6a and described more fully below.

As illustrated at step 16, the procedure builds a training set for a given word comprising a list of utterances of the word. This training set can be from different speakers (to build a speaker-independent word model) or from one single speaker (to build a speaker-dependent word model). As illustrated, the data are prepared for training by computing the HS regions for all training utterances.

The objective of the word prototype is to build a compact word model based on the HS regions. The representation is defined by:

(a) average word duration expressed in number of 10 millisecond frames;

(b) list of targets (a target represents a typical production of an HS region for a phoneme. It is obtained during a word training procedure by averaging two or more examples of the same HS region. In the process one parameter, which is the probability of observing the HS region is added. There are therefore 6 parameters for modeling a target.)

(c) average recognition score over the training data.

A word-to-word alignment is performed to find the region-to-region relation between two utterances of the same word. The alignment process uses a search procedure that assumes a linear relation (y=ax+b) between the two utterances. The alignment is designed to obtain an alignment time much smaller than a conventional dynamic time warping (DTW) alignment. This same alignment procedure is also used during the recognition process in order to avoid introducing any bias.

The search procedure used in step 16 is iterative (successive refinement of the "a" "b" parameters) to allow for time distortion between the test word and the word prototype. Three iterations are performed in the presently preferred embodiment. In this successive refinement parameter "a" represents the time dilation and parameter "b" represents an offset in the test word. An estimation of the "a" and "b" parameters allows adjustment to compensate for variation in word duration and to compensate for possible errors in the endpoint detection procedure used in step 10.

The alignment procedure results in a list of region-region pairs. In practice, all regions of a first utterance may not be aligned with regions of a second utterance, because of the inherent variability in the pronunciation across speakers or within a same speaker.

Whereas step 14 results in a selection of HS regions that exceed a predefined threshold, merely exceeding this threshold does not mean that a given HS region from a given utterance is necessarily reliable. Thus in step 24 the reliable HS regions are detected within a word utterance, to identify the HS regions present in a word utterance that are stable across multiple repetitions of the same word. The technique used is to compute the word-to-word alignment between a given word utterance and all remaining utterances of the word in the training set. By doing so, the probability of observing the region is obtained. The probability is defined as the number of times the region could be aligned in all remaining utterances divided by the number of those utterances. The procedure discards the HS regions in the word utterance whose probability is below a certain target probability threshold. This threshold, like the region picking threshold used in step 14 can be determined empirically to achieve the desired target rate.

Continuing with the word training procedure, refer to FIG. 2b. In FIG. 2b step 24 has been repeated to show continuity with FIG. 2a. In step 26 a word model is now constructed by a successive merging of the data from each of the n utterances. Step 26 is shown in detail in FIG. 2c. Referring to FIG. 2c, the word model is built by merging together all the training utterances each described as a list of HS regions and their duration. At each step in the iteration, a partial word model is built. When the last utterance is merged, the partial word prototype is consolidated and the word prototype is thereby obtained. This iterative merging procedure is performed by selecting the word utterance whose duration is closer to the average word duration over the training set and setting this word utterance to be the initial partial word prototype. Step 29. Then, each remaining utterance is merged to build a new partial prototype incrementally. Step 30. The merging uses a word-to-partial utterance alignment procedure. After the merging is complete a target rate constraint is applied by adjusting the number of targets to be kept. In this way a more compact word model is obtained.

The word-to-partial utterance alignment essentially finds the region-to-partial target relation between the word utterance and the partial prototype. A search procedure is performed that assumes a linear relation (y=ax+b) between the word utterance and the partial prototype. The objective is to obtain an alignment time that is much smaller than a conventional DTW alignment. This same alignment procedure is used in the recognition process in order to avoid introducing any bias. The search procedure is iterative (successive refinement of the "a" and "b" parameters) to allow for time distortion between the test word and the word prototype. Three iterations are performed in the presently preferred embodiment. The "a" parameter represents the time dilation and the "b" parameter represents an offset in the test word. Estimation of the "a" and "b" parameters allows for adjustment to compensate for variation in word duration and to compensate for possible errors in the endpoint detection. This procedure 28 produces a list of region-partial target pairs. In practice, all partial targets may not be aligned with regions of the word utterance, because of the inherent variability in the pronunciation across speakers or within the same speaker.

The word utterance is merged with its partial prototype. Initially, word-to-partial utterance alignment is performed. Next, for each of the aligned partial targets the center height, center frame and left and right frame location statistics are updated. Finally, all unaligned regions of the word utterance are inserted in the partial prototype with their statistics set to an initial value corresponding to the inserted HS region's parameters.

Finally, the final partial prototype is consolidated at step The consolidation procedure is used to finalize the word prototype. The procedure involves computing the average values for the center height, center frame and left and right frame locations for each partial target. The computed values become the parameters of the target. In addition, the procedure computes an estimate of the probability of each newly built target by aligning the word prototype with all of the utterances of the training set. The average recognition rate is also computed by executing a single word comparison procedure for each utterance of the word in the training set.

In some applications it may be desirable to adjust the target rate, to achieve a given level of compactness in the modeling of words. Referring to FIG. 2b, this step may be performed at 34. Given a target rate value and the average duration of a word, the desired number n of targets for that word is given by the target rate multiplied by the average duration. Only the top n targets having the highest probability are kept. Finally, in step 36, the average match rate is computed over the training data to be used as part of the global statistics for subsequent word hypothesizer and recognizer operations.

FIG. 4 provides an example of the output from the phoneme similarity calculation module 124. FIG. 3 shows the phoneme similarity data for the word "Johnson" for one training speaker. The ordinant axis represents the phoneme similarity value. The abscissa axis represents time which is broken-up into 80 time frames. The data are arranged in an 11×5 matrix, representing the 55 phonemes (phonemes) the current embodiment. The letter or letters in the upper left-hand corner of each square in the matrix denotes the particular phoneme being analyzed for the degree in which that particular phoneme was found in the word "Johnson" and at which time frame locations.

FIG. 5 shows a comparison of phoneme similarity data for the same word "Johnson," but as spoken in four different utterances. This figure highlights the problem to which this present invention is directed—namely, representing a word with enough detail to overcome the differences in speaking patterns by different speakers, while at the same time using as little data as needed for performing speech recognition calculations efficiently and quickly.

The present invention uses a novel word representation that provides enough detail to efficiently and quickly analyze speakers' utterances. FIG. 6a shows the novel word representation for particular phoneme similarity data. The novel word representation for a word prototype is based on the identification of "interesting regions" of phoneme similarity values. A region is defined as a region of high or low phoneme similarity values. The presently preferred embodiment relies on regions of high similarity (HS regions) that represent peaks above a predetermined threshold. However, the principles of the invention can be extended to modeling regions of low similarity, as well. As shown in FIG. 6a, the phoneme similarity data can correspond to one or more interesting regions of phoneme similarity values. For those regions that exceed the similarity threshold 300, certain features are analyzed to produce the parameterization data used to define the targets for a word prototype. One feature is the HS region 304. Since an HS region may contain several peaks, a section is modeled as a single triangular peak 314 using the region picking procedure. Thus, the original curve 316 that comprises this section is now represented by a triangular shape 314. While the present embodiment uses a unimodal (triangular) representation, more complex models could be utilized. See FIG. 11.

The HS region 304 determines the HS region height 306, measured in units of phoneme similarity. Other features of an HS region include the left boundary frame 308, the center frame 310, and the right boundary frame 312. Each of these features is measured in units of time.

Figure 6B:
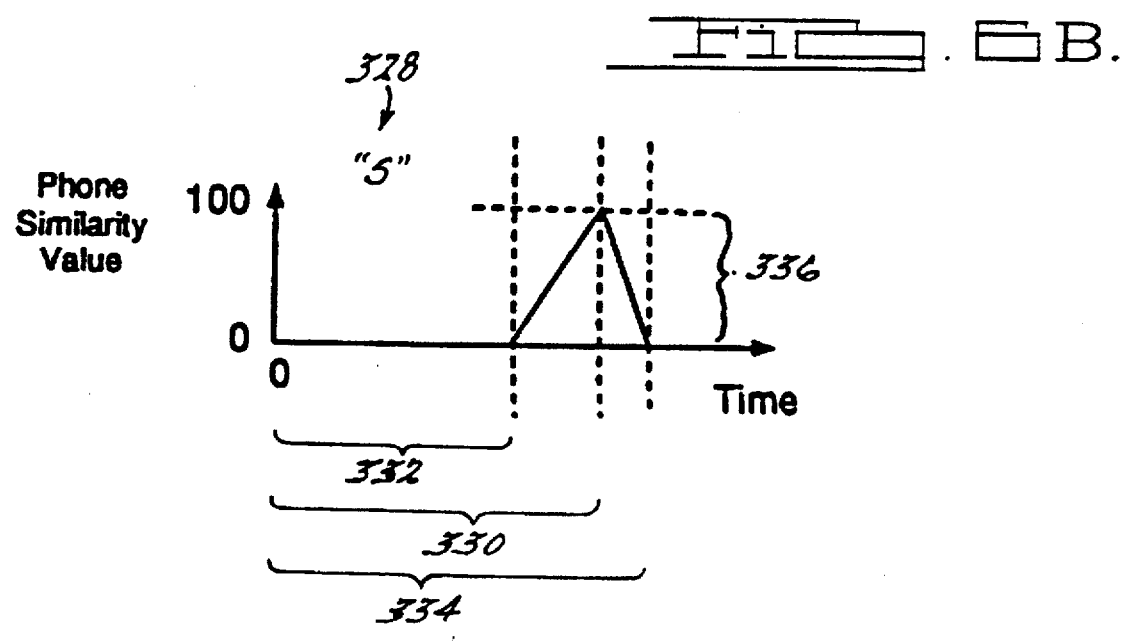
FIG. 6b is a graph generically illustrating the phoneme similarity curve in a unimodal representation along with its target features.
Figure 7:
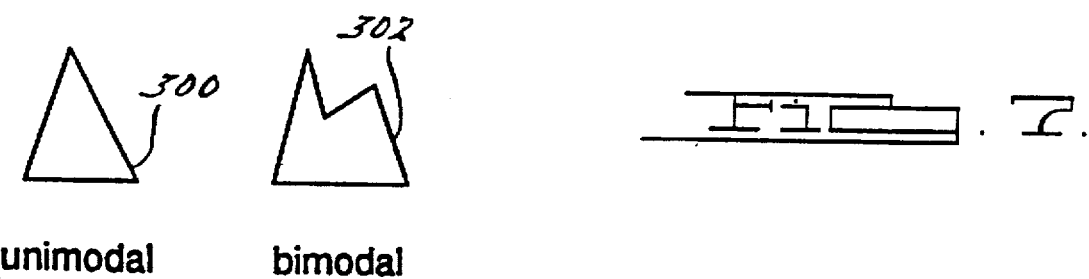
FIG. 7 compares the unimodal representation and an alternative bimodal representation.

FIG. 6b shows an example of a target generated according to the present invention. A target is a unified phoneme representation or parameterized model of an HS region derived from the training of several occurrences of the same section over the training set. In the preferred embodiment, a target consists of at least two essential features: the phoneme symbol 328 and the average center frame 330. For greater resolution of a target, the following other features may be used: the average left boundary frame 332; the average right boundary frame 334; and the average center height 336. Average values are used since a target represents one or more speech utterances per phoneme.

Associated with each target is statistical information representing the probability of observing the target. The probability of observing the target is determined by observing the number of occurrences of the HS region in the training utterances divided by the number of training utterances. For example, the probability of observing a target would be 50% when 10 utterances out of 20 utterances exhibited the presence of a given HS region.

The probability value is used to help calculate the weight that is applied when using the word prototype in speech recognition. Other statistical measures may also be used. For example, a weighting factor may be calculated as the product of the probability of observing the target and the average center height. The weighting factor would be another representative measure of the importance of a target.

Figure 3A:
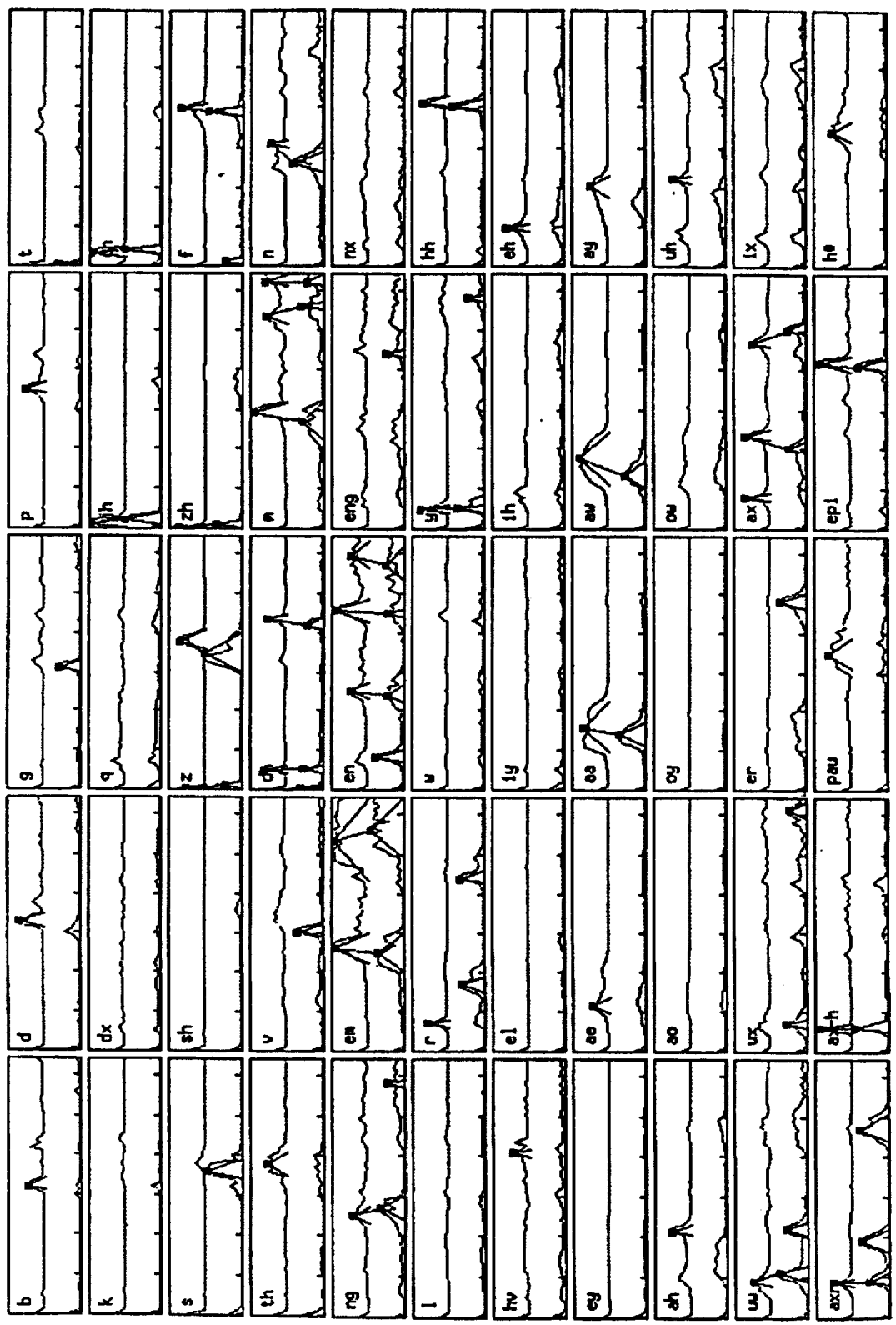
FIG. 3a is a graph illustrating the word-to-word alignment that is used for computing the reliable sections of phoneme similarity values.
Figure 3B:
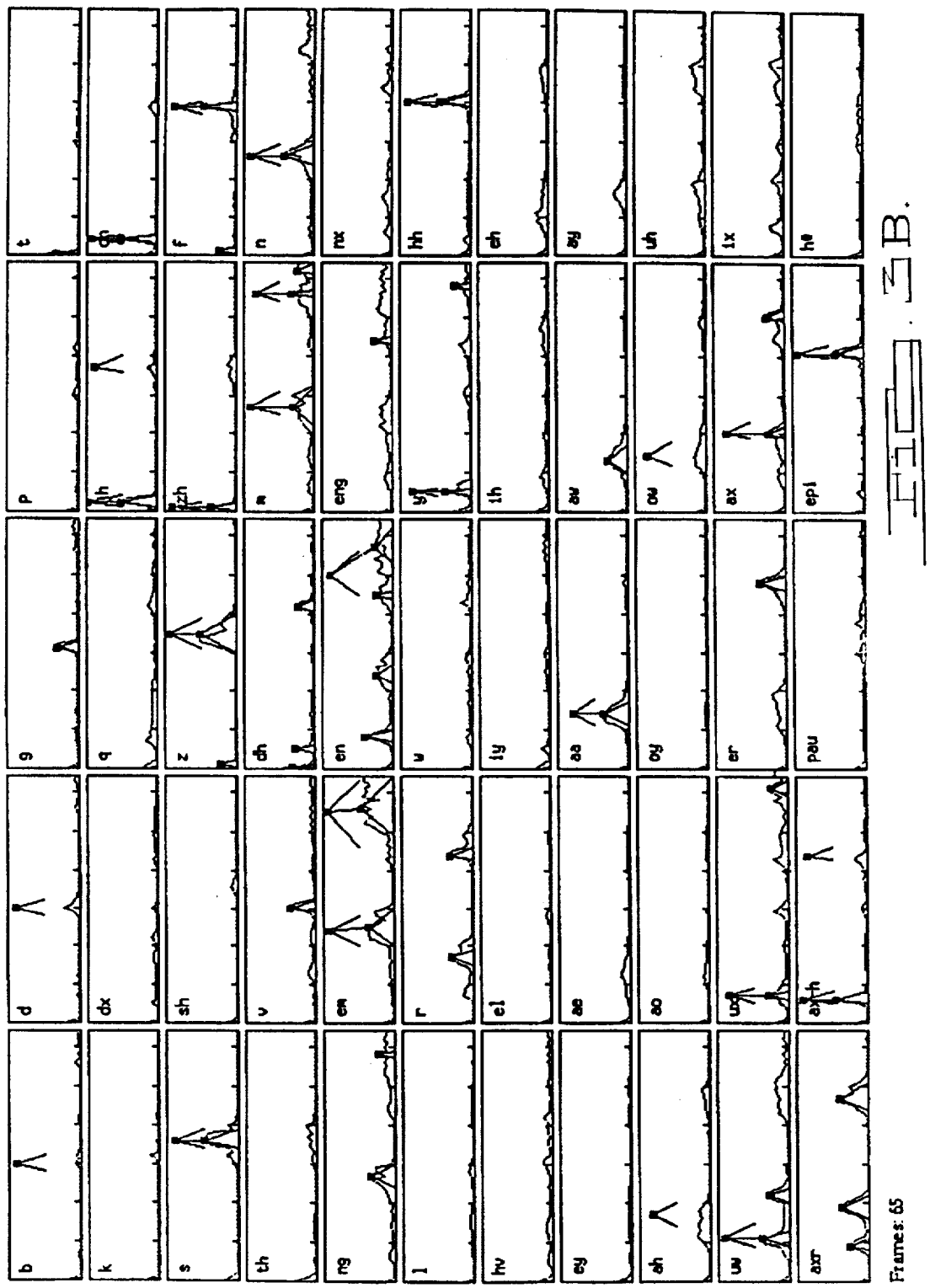
FIG. 3b is a graph illustrating the prototype-to-word alignment performed during recognition.

Referring to FIG. 10 and also to FIGS. 3a and 3b, the alignment process compares one utterance to another utterance and performs the appropriate rescaling to align the two. The rescaling may be done by assuming linear warping which is represented by the following equation:

$$y = a_o x$$

In this equation, "x" represents the number of time frames of one utterance (utterance 1), and "y" represents the number of time frames of the other utterance (utterance 2). The coefficient "$a_o$" is the proportionality constant in the relationship between "x" and "y." In this example, if utterance 1 is 70 time frames, and utterance 2 is 50 time frames, the coefficient "$a_o$" would have a value of "50/70" or "5/7."

Each of the curves of utterance 1 are normalized to the scale of utterance 2 by multiplying their respective values by "5/7." This normalization process results in the normalized utterance 1 now on the same scale as utterance 2 (i.e., over 50 frames).

The second step of the alignment process is to estimate the linear regression on the aligned peaks according to the following equation.

$$y = a_1 x + b_1$$

In this equation, "x" represents the time value of each peak of normalized utterance 1, while "y" represents the time value of each peak of utterance 2. An "x" data value is coupled to its corresponding "y" data value due to representing the same phoneme. The coefficient values are determined by performing a linear regression upon the "x" and "y" data points which indicate how well the peaks of the normalized utterance 1 have aligned with the peaks of utterance 2. The linear regression step is an improvement over the linear warping of step 1 for estimating how well two utterances align.

The third step of the alignment process performs another linear regression to better estimate the alignment between the "x" and "y" data points:

$$y = a_2 x + b_2$$

These coefficient values yield a more accurate assessment of the alignment as exists between the HS regions of normalized utterance 1 and the HS regions of utterance 2.

The last step of the alignment process is to build an alignment structure that lists the aligned regions as well as the alignment rate and the match rate based upon the "$a_2$" and "$b_2$" coefficients.

FIGS. 3a and 3b show the word-to-word alignment used to compute the reliable regions of the phoneme similarity values after the threshold value test had been applied. These figures show two utterances of the word "Johnson." The first utterance phoneme similarity values for each phoneme are depicted in the top portion of each phoneme graph. The second utterance phoneme similarity values for each phoneme are located in the lower portion of each phoneme graph. Alignments between the two utterances for each graph are shown by the links between the sections. These links show the phoneme sections that have been deemed most reliable. The identification of these reliable region by the alignment process allows a unified representation of a phoneme for a given word prototype.

FIG. 3b shows the word prototype in the upper portion of each graph and a speaker's utterance at the lower portion for the word "Johnson." This figure highlights the iterative nature of the word prototyping process. The word prototype is iteratively refined by aligning it with a new utterance.

Figure 8A:
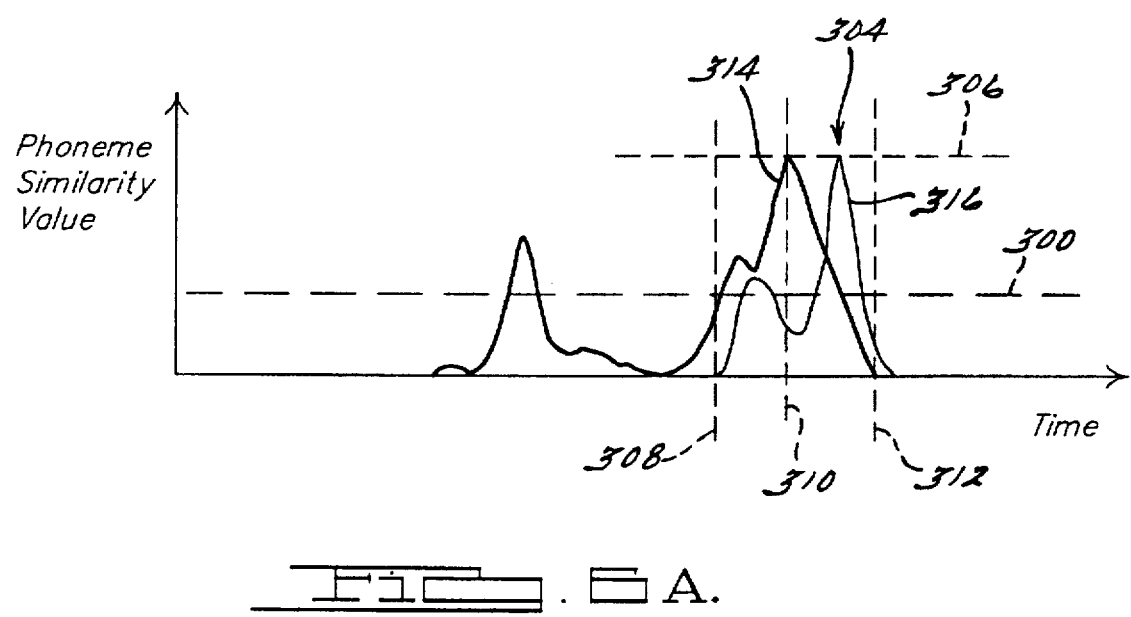
FIG. 8 is a set of graphs using only two target features (center height and center location) to represent a word prototype.

FIG. 8 is an example of using fewer than all of the target features for describing a particular phoneme. The target features depicted here for each phoneme are: 1) center frame; and 2) center height. The similarity threshold value was set to 50 and the section reliability threshold (i.e., minimum probability) was set to 70.

FIG. 9 is an example of depicting phonemes by a greater number of target features. The target features here are: 1) center frame; 2) left boundary frame; 3) right boundary frame; 4) center height; 5) target probability; and 6) weight. The similarity threshold value was set to 40 and the section reliability threshold (i.e., minimum probability) was set to 50.

The word prototype not only contains information of utterances at a phoneme level (i.e., the target information), but also contains information on a word-level—namely, global statistics. Global statistics in the preferred embodiment include average number of frames, average match rate, minimum match rate, maximum match rate, and average number of detected region per utterance. The average number of frames indicates the duration of the word with respect to its training data. The average match rate is a measure of the goodness-of-fit of the word prototype. The minimum and maximum match rates indicate what were the best and worst occurrences for each word prototype. The match rate in general is the degree-of-fit of the word prototype to its training data.

Characteristics of the Word Prototype Representation

The present invention's word prototype representation which is based on the identification of reliable regions of similarity values satisfies several needs of a real-time speech recognition system. The present invention's word prototype representation satisfies the need for a low data rate. The target rate here which ranges from 10 to 30, is lower than the typical frame rate of 100 as found in the prior art. Furthermore, there are less features per target (i.e., 2 to 6 typically) than in the per frame approach (i.e., 55 for standard model speech method).

The present invention's word prototype representation satisfies the speech recognition need of an adjustable degree of detail for speech recognition. First, the similarity threshold value (i.e., minimal section similarity) can range from 30 to 80. Secondly, a section reliability threshold (i.e., minimum probability) can have a practical range of 15% to around 90%.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A method of electronically representing a given spoken word or phrase as a digital prototype comprising:

providing phoneme templates representing a database of standard speech;

for a first training instance of said given word or phrase, comparing the first training instance with said phoneme templates to produce first phoneme similarity data as a function of time;

processing said first phoneme similarity data to extract first training instance features that exceed a predetermined similarity threshold;

for at second training instance of said given word or phrase, comparing the second training instance with said phoneme templates to produce second phoneme similarity data as a function of time;

processing said second phoneme similarity data to extract second training instance features that exceed a predetermined similarity threshold;

aligning the extracted first and second training instance features and selecting those features that achieve a predetermined degree of correlation between first and second training instances to produce time-dependent speaker-independent phoneme similarity data;

building word prototype targets corresponding to the time-dependent speaker-independent phoneme similarity data, the word prototype targets each including a phoneme symbol and at least one datum indicative of a phoneme similarity score;

using said phoneme symbol and said phoneme similarity score as a digital prototype to electronically represent the given speech utterance.

2. The method of claim 1 further comprising the step of:

determining center height of at least one of said first and second training instance features.

3. The method of claim 1 further comprising the step of: determining center frame of at least one of said first and second training instance features.

4. The method of claim 1 further comprising the step of: determining left boundary frame of at least one of said first and second training instance features.

5. The method of claim 1 further comprising the step of: determining right boundary frame of at least one of said first and second training instance features.

6. The method of claim 1 further comprising the step of: determining average center height of each of said word prototype targets and storing said average center height in association with said word prototype target.

7. The method of claim 1 further comprising the step of: determining average center frame of each of said word prototype targets and storing said average center frame in association with said word prototype target.

8. The method of claim 1 further comprising the step of: determining average left boundary frame of each of said word prototype targets and storing said average left boundary frame in association with said word prototype target.

9. The method of claim 1 further comprising the step of: determining average right boundary frame of each of said word prototype targets and storing said average right boundary frame in association with said word prototype target.

10. The method of claim 1 further comprising the step of: determining probability of target observation of each of said word prototype targets and storing said probability of target observation in association with said word prototype target.

11. The method of claim 1 further comprising the step of: determining weight of each of said word prototype targets and storing said weight in association with said word prototype target.

12. The method of claim 1 further comprising the step of: determining global statistics of said digital word prototype and storing said global statistics in association with said digital word prototype.

13. The method of claim 12 wherein said step of determining global statistics of said digital word prototype, further including: determining average number of frames of said digital word prototype and storing said average number of frames in association with said digital word prototype.

14. The method of claim 12 wherein said step of determining global statistics of said digital word prototype, further including: determining average match rate of said digital word prototype and storing said average match rate in association with said digital word prototype.

15. The method of claim 12 wherein said step of determining global statistics of said digital word prototype, further including: determining minimum match rate of said digital word prototype and storing said minimum match rate in association with said digital word prototype.

16. The method of claim 12 wherein said step of determining global statistics of said digital word prototype, further including: determining maximum match rate of said digital word prototype and storing said maximum match rate in association with said digital word prototype.

17. The method of claim 12 wherein said step of determining global statistics of said digital word prototype, further including: determining average number of detected sections of said first training instance features and said second training instance features and storing said average number of detected sections in association with said digital word prototype.

18. The method of claim 1 wherein the step of aligning the extracted first and second training instance features, further including:
selecting the extracted first training instance features that correspond to said extracted second training instance features;
building an alignment structure that defines a set of aligned peaks between said selected first training instance features and extracted second training instance features and defines data indicative of degree of correlation for each of said aligned peaks.

19. The method of claim 18 further including: normalizing said selected first training instance features to same time scale as said corresponding extracted second training instance features.

20. The method of claim 18 further including: performing linear regression between said selected first training instance features and said corresponding extracted first training instance features.

21. The method of claim 18 further including:
normalizing said selected first training instance features to same time scale as said corresponding extracted second training instance features; and
performing linear regression between said selected first training instance features and said corresponding extracted second training instance features.

22. An apparatus for electronically representing a given speech utterance signal as a digital word prototype comprising:
a phoneme template for representing a database of calibration speech;
means for comparing the utterance signal of said first speaker with said phoneme template to produce first speaker phoneme similarity data as a function of time for said given speech utterance signal of a first speaker;
means for processing said first speaker phoneme similarity data to extract first speaker features that exceed a predetermined similarity threshold;
means for comparing the utterance signal of said second speaker with said phoneme template to produce second speaker phoneme similarity data as a function of time for said given speech utterance signal of a second speaker;
means for processing said second speaker phoneme similarity data to extract second speaker features that exceed a predetermined similarity threshold;
means for aligning the extracted first and second speaker features and selecting those features that achieve a predetermined degree of correlation between first and second speakers to produce time-dependent speaker-independent phoneme similarity data;
means for building word prototype targets corresponding to the time-dependent speaker-independent phoneme similarity data, the word prototype targets each including a phoneme symbol and at least one feature location datum indicative of a time location of that feature;
means for using said word prototype targets as said digital word prototype to electronically represent the given speech utterance.

23. A method of electronically representing a given spoken word or phrase as a digital prototype, comprising:

providing phoneme templates representing a database of standard speech;

providing a plurality of training instances of said given spoken word or phrase;

for each training instance, comparing the training instance with said phoneme templates to produce training instance phoneme similarity data as a function of time;

building a digital prototype corresponding to the time-dependent phoneme similarity data, said prototype consisting of at least a list of high phoneme similarity region targets, each target having a phoneme identifier and feature data including at least one time location datum indicative of a time location of that phoneme.

24. The method of claim 23 wherein said digital prototype consists of global statistics in addition to said list of high phoneme similarity region targets.

25. The method of claim 24 further comprising including in the global statistics of said word or phrase prototype the average of the alignment scores of the training instances.

26. The method of claim 24 further comprising including in the global statistics of said word or phrase prototype the average of the duration of the training instances.

27. The method of claim 23 further comprising the steps of: producing word prototype targets of said given word or phrase by incrementally merging said phoneme similarity data of said training instances.

28. The method of claim 27 wherein said merging step is performed as follows:

for a first training instance of said given spoken word or phrase, comparing the first training instance with said phoneme templates to produce first phoneme similarity data as a function of time;

processing said first phoneme similarity data to extract first training instance high similarity regions for which the phoneme similarity value exceeds a predetermined phoneme similarity threshold;

initializing said list of high phoneme similarity region targets as the feature data of the first training instance high similarity regions which exceed said predetermined phoneme similarity threshold;

for each succeeding training instance of said given spoken word or phrase, comparing the signal of said succeeding training instance with said phoneme templates to produce succeeding phoneme similarity data as a function of time;

processing said succeeding phoneme similarity data to extract succeeding training instance high similarity regions for which the phoneme similarity value exceeds a predetermined phoneme similarity threshold;

aligning said succeeding training instance high similarity regions with said list of high phoneme similarity region targets;

for each succeeding training instance high similarity region which does not match a high phoneme similarity region target in said alignment, initializing a new high phoneme similarity region target to include the feature data of said matched high similarity region;

for each succeeding training instance high similarity region which does match a high phoneme similarity region target in said alignment, updating the values of said high phoneme similarity region target to include the feature data of said matched high similarity region.

29. The method of claim 23 further comprising the step of: determining the center height of at least one of said training instance high similarity regions.

30. The method of claim 23 further comprising the step of: determining the center frame of at least one of said training instance high similarity regions.

31. The method of claim 23 further comprising the step of: determining the left boundary frame of at least one of said training instance high similarity regions.

32. The method of claim 23 further comprising the step of: determining the right boundary frame of at least one of said training instance high similarity regions.

33. The method of claim 23 further comprising the step of: determining the average center height of the training instance high similarity regions which match a given high phoneme similarity region target in said alignment, and storing said average center height as feature data in association with said high phoneme similarity region target.

34. The method of claim 23 further comprising the step of: determining the average center frame of the training instance high similarity regions which match a given high phoneme similarity region target in said alignment, and storing said average center frame as feature data in association with said high phoneme similarity region target.

35. The method of claim 24 further comprising the step of: determining the average left boundary frame of the training instance high similarity regions which match a given high phoneme similarity region target in said alignment, and storing said average center frame as feature data in association with said high phoneme similarity region target.

36. The method of claim 24 further comprising the step determining the average right boundary frame of the training instance high similarity regions which match a given high phoneme similarity region target in said alignment, and storing said average center frame as feature data in association with said high phoneme similarity region target.

37. The method of claim 23 further comprising the step of: determining the probability of a given high phoneme similarity region target as the fraction of said training instances of said given spoken word or phrase containing at least one high similarity region which is matched to said given high phoneme similarity region target in said alignment, and storing said probability as feature data in association with said high phoneme similarity region target.

38. The method of claim 23 further comprising the step of: determining weight of each of said word prototype targets and storing said weight in association with said word prototype target.

39. The method of claim 23 further comprising the step of: determining global statistics of said digital word prototype and storing said global statistics in association with said digital word prototype.

40. The method of claim 39 wherein said step of determining global statistics of said digital word prototype, further including:

determining average number of frames of said digital word prototype and storing said average number of frames in association with said digital word prototype.

41. The method of claim 39 wherein said step of determining global statistics of said digital word prototype, further including:

determining average match rate of said digital word prototype and storing said average match rate in association with said digital word prototype.

42. The method of claim 39 wherein said step of determining global statistics of said digital word prototype, further including:
  determining minimum match rate of said digital word prototype and storing said minimum match rate in association with said digital word prototype.

43. The method of claim 39 wherein said step of determining global statistics of said digital word prototype, further including:
  determining maximum match rate of said digital word prototype and storing said maximum match rate in association with said digital word prototype.

44. An apparatus for electronically representing a given spoken word or phrase as a digital prototype, comprising:
  a phoneme template for representing a database of standard speech;
  means for receiving a plurality of training instances of a given spoken word or phrase;
  means for comparing each training instance of the spoken word or phrase with said phoneme template to produce training instance phoneme similarity data as a function of time for said training instance of the given word or phrase;
  means for processing said training instance phoneme similarity data to extract regions that exceed a predetermined phoneme similarity threshold;
  means for producing word prototype targets of said given word or phrase by incrementally merging said training instance phoneme similarity data;
  means for building target congruence prototypes corresponding to the time-dependent phoneme similarity data, the prototype targets comprising at least a list of phoneme targets, each including a phoneme identifier and feature data including at least one time location datum indicative of a time location of that phoneme;
  means for using said target congruence prototype as said digital prototype for said given spoken word or phrase.

45. The apparatus of claim 44 wherein said prototype targets further comprise global statistics in addition to said list of phoneme targets.

* * * * *

UNITED STATES PATENT AND TRADEMARK OFFICE
CERTIFICATE OF CORRECTION

PATENT NO. : 5,684,925
DATED : November 4, 1997
INVENTOR(S) : Philippe R. Morin, Ted H. Applebaum It is certified that error appears in the above-identified patent and that said Letters Patent is hereby corrected as shown below:

In the Abstract, line 2, after "high" insert --phoneme--

In the Abstract, line 4, after "high" delete --phoneme--

Column 14, line 31, claim 36, after "step" insert --of:--

Signed and Sealed this

Thirty-first Day of March, 1998

Attest:

BRUCE LEHMAN

Attesting Officer      Commissioner of Patents and Trademarks